US010080924B2

United States Patent
Sajima

(10) Patent No.: US 10,080,924 B2
(45) Date of Patent: Sep. 25, 2018

(54) GOLF BALL

(71) Applicant: DUNLOP SPORTS CO. LTD., Kobe-shi, Hyogo (JP)

(72) Inventor: Takahiro Sajima, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 569 days.

(21) Appl. No.: 13/906,493

(22) Filed: May 31, 2013

(65) Prior Publication Data

US 2013/0324319 A1 Dec. 5, 2013

(30) Foreign Application Priority Data

Jun. 1, 2012 (JP) ................................ 2012-126601

(51) Int. Cl.
*A63B 37/02* (2006.01)
*A63B 37/00* (2006.01)
(Continued)

(52) U.S. Cl.
CPC ...... *A63B 37/0039* (2013.01); *A63B 37/0051* (2013.01); *C08K 5/098* (2013.01);
(Continued)

(58) Field of Classification Search
CPC . C08K 5/0025; A63B 37/0039; A63B 37/044; A63B 37/0062; A63B 37/0063;
(Continued)

(56) References Cited

U.S. PATENT DOCUMENTS

| 4,688,801 A | * | 8/1987 | Reiter | .................. C08F 279/02 |
| | | | | 473/372 |
| 5,403,010 A | | 4/1995 | Yabuki et al. | |

(Continued)

FOREIGN PATENT DOCUMENTS

| JP | 61-37178 A | 2/1986 |
| JP | 61-113475 A | 5/1986 |

(Continued)

OTHER PUBLICATIONS

English translation of the Notice of Reasons for Rejection for Japanese Application No. 2012-126601 dated Mar. 29, 2016.

(Continued)

*Primary Examiner* — John E Simms, Jr.
(74) *Attorney, Agent, or Firm* — Birch, Stewart, Kolasch & Birch, LLP

(57) ABSTRACT

An object of the present invention is to provide a golf ball having a novel core structure and traveling a great flight distance on driver shots. The present invention provides a golf ball comprising a core composed of a spherical center and an envelope layer and at least one cover layer disposed outside the core, wherein the spherical center has an internal hardness difference between a maximum hardness and a minimum hardness of less than 5 in JIS-C hardness, the envelope layer is formed from an envelope rubber composition containing (a) a base rubber, (b) an α,β-unsaturated carboxylic acid having 3 to 8 carbon atoms and/or a metal salt thereof as a co-crosslinking agent, (c) an crosslinking initiator and (d) an acid and/or a salt thereof, and the outermost cover layer has a highest hardness among the constituent members of the golf ball.

10 Claims, 1 Drawing Sheet

(51) Int. Cl.
  *C08K 5/14* (2006.01)
  *C08L 9/00* (2006.01)
  *C08K 5/098* (2006.01)
  *C08L 23/08* (2006.01)

(52) U.S. Cl.
  CPC .............. *C08K 5/14* (2013.01); *C08L 9/00* (2013.01); *A63B 37/0031* (2013.01); *A63B 37/0045* (2013.01); *A63B 37/0063* (2013.01); *A63B 37/0076* (2013.01); *A63B 37/0092* (2013.01); *A63B 37/0096* (2013.01); *C08L 23/0807* (2013.01); *C08L 23/0869* (2013.01); *C08L 23/0876* (2013.01)

(58) Field of Classification Search
  CPC ............ A63B 37/0043; A63B 37/0064; A63B 37/0076; A63B 37/0092; C08L 23/0807; C08L 23/0869; C08L 23/0876; C08L 75/04; C08L 77/02; C08L 77/04; C08L 77/06; C08L 77/08; C08L 77/10; C08L 77/12
  See application file for complete search history.

(56) References Cited

U.S. PATENT DOCUMENTS

| | | | | |
|---|---|---|---|---|
| 5,779,562 | A * | 7/1998 | Melvin et al. | 473/373 |
| 5,935,022 | A | 8/1999 | Sugimoto et al. | |
| 5,980,396 | A * | 11/1999 | Moriyama et al. | 473/376 |
| 6,180,722 | B1 | 1/2001 | Dalton et al. | |
| 6,919,393 | B2 | 7/2005 | Mano et al. | |
| 7,803,861 | B1 * | 9/2010 | Binette | C08F 220/06 524/322 |
| 2002/0037778 | A1 * | 3/2002 | Nakamura | A63B 37/0003 473/377 |
| 2003/0144425 | A1 | 7/2003 | Mano et al. | |
| 2005/0267240 | A1 * | 12/2005 | Chen | A63B 37/0003 524/322 |
| 2005/0282659 | A1 | 12/2005 | Kennedy, III et al. | |
| 2006/0135287 | A1 | 6/2006 | Kennedy, III et al. | |
| 2006/0229143 | A1 * | 10/2006 | Watanabe et al. | 473/378 |
| 2007/0173607 | A1 | 7/2007 | Kennedy, III et al. | |
| 2007/0202965 | A1 | 8/2007 | Shindo et al. | |
| 2007/0265113 | A1 | 11/2007 | Hirau et al. | |
| 2008/0171617 | A1 * | 7/2008 | Boehm et al. | 473/374 |
| 2008/0194357 | A1 | 8/2008 | Higuchi | |
| 2008/0194359 | A1 | 8/2008 | Higuchi et al. | |
| 2008/0214324 | A1 | 9/2008 | Nanba et al. | |
| 2009/0124757 | A1 | 5/2009 | Shindo et al. | |
| 2010/0035704 | A1 * | 2/2010 | Nakamura et al. | 473/376 |
| 2010/0048327 | A1 * | 2/2010 | Bulpett | A63B 37/0038 473/374 |
| 2010/0075778 | A1 * | 3/2010 | Kamino et al. | 473/376 |
| 2010/0081517 | A1 * | 4/2010 | Sullivan et al. | 473/373 |
| 2010/0160087 | A1 * | 6/2010 | Nakamura et al. | 473/375 |
| 2010/0216572 | A1 * | 8/2010 | Umezawa et al. | 473/373 |
| 2010/0273575 | A1 | 10/2010 | Watanabe | |
| 2011/0045923 | A1 * | 2/2011 | Umezawa et al. | 473/373 |
| 2011/0105244 | A1 * | 5/2011 | Fushihara et al. | 473/371 |
| 2012/0077621 | A1 * | 3/2012 | Ishii et al. | 473/376 |
| 2012/0088604 | A1 | 4/2012 | Matsuyama et al. | |
| 2012/0165119 | A1 * | 6/2012 | Murakami | A63B 37/0054 473/372 |
| 2013/0029786 | A1 * | 1/2013 | Ishii | A63B 37/0061 473/373 |

FOREIGN PATENT DOCUMENTS

| | | |
|---|---|---|
| JP | 61-253079 A | 11/1986 |
| JP | 6-154357 A | 6/1994 |
| JP | 8-322964 A | 12/1996 |
| JP | 10-57523 A | 3/1998 |
| JP | 11-206920 A | 8/1999 |
| JP | 2003-164546 A | 6/2003 |
| JP | 2006-230661 A | 9/2006 |
| JP | 2006-346014 A | 12/2006 |
| JP | 2007-222622 A | 9/2007 |
| JP | 2008-523952 A | 7/2008 |
| JP | 2008-194471 A | 8/2008 |
| JP | 2008-194473 A | 8/2008 |
| JP | 2008-212681 A | 9/2008 |
| JP | 2009-502445 A | 1/2009 |
| JP | 2009-119256 A | 6/2009 |
| JP | 2010-253268 A | 11/2010 |
| JP | 2012-80923 A | 4/2012 |

OTHER PUBLICATIONS

European Office Action, dated Oct. 11, 2016, for European Application No. 13169424.2.

English translation of a Japanese Office Action, dated Nov. 15, 2016, for Japanese Application No. 2012-126601.

* cited by examiner

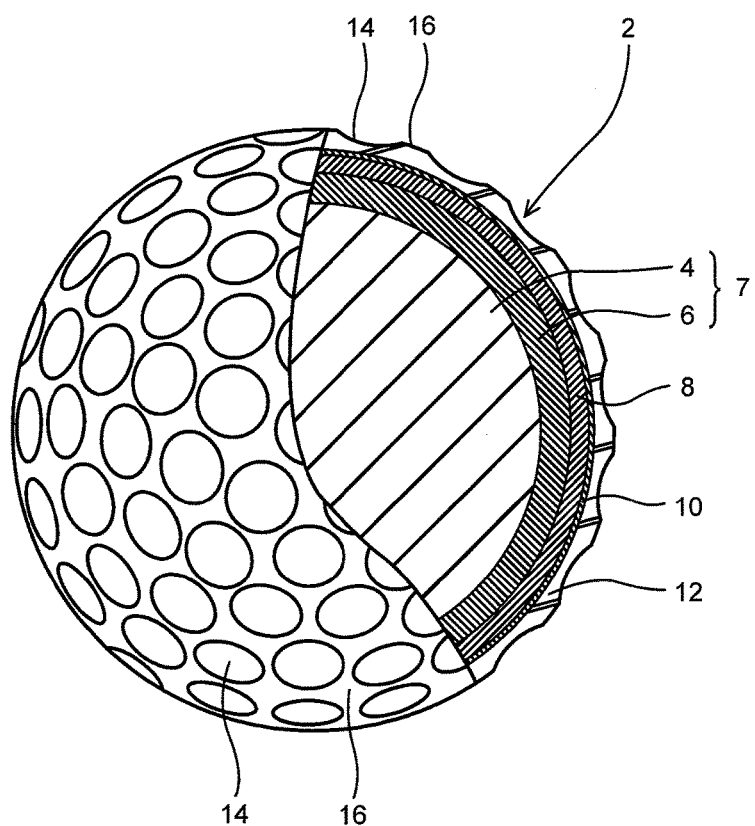

GOLF BALL

FIELD OF THE INVENTION

The present invention relates to a golf ball traveling a great flight distance on driver shots.

DESCRIPTION OF THE RELATED ART

As a method for improving flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publications Nos. S61-37178 A, S61-113475 A, S61-253079 A, 2008-212681 A, 2008-523952 A and 2009-119256 A disclose a technique of enhancing resilience of the core. Japanese Patent Publication No. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended.

Japanese Patent Publication No. S61-253079 A discloses a solid golf ball formed from a rubber composition containing an α,β-unsaturated carboxylic acid in an amount of 15 parts to 35 parts by weight, a metal compound to react with the α,β-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an α,β-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises; (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, and (B) from 80 wt % to 0 wt % of a diene rubber other than (A) the above rubber component [the figures are represented by wt % in the case that a total amount of (A) and (B) equal to 100 wt %] and (C) an unsaturated carboxylic acid and/or a metal salt thereof.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf and has the hardness distribution shown in the following table.

TABLE 1

| Hardness distribution in solid core | Shore D hardness |
| --- | --- |
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q)-(S)] | 1 to 10 |
| Hardness difference [(S)-(R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf and has the hardness distribution shown in the following table.

TABLE 2

| Hardness distribution in solid core | Shore D hardness |
| --- | --- |
| Center | 25 to 45 |
| Region located 5 to 10 mm from center | 39 to 58 |
| Region located 15 mm from center | 36 to 55 |
| Surface (S) | 55 to 75 |
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)-(II) in JIS-C units being within ±2; and the envelope layer, intermediate layer and cover have hardness which satisfy the condition: cover hardness>intermediate layer hardness>envelope layer hardness.

SUMMARY OF THE INVENTION

A core with an outer-hard inner-soft structure produces a low spin rate and thus the resultant golf ball travels a great flight distance, but an initial speed of the resultant golf ball may be lowered. However, if a core has an outer-hard inner-soft structure as well as a high initial speed, the resultant golf ball is expected to travel an even greater flight distance on driver shots. The present invention has been achieved in view of the above circumstances. An object of the present invention is to provide a golf ball having a novel core structure and traveling a great flight distance on driver shots.

The present invention provides a golf ball comprising a golf ball comprising a core composed of a spherical center and an envelope layer and at least one cover layer disposed outside the core, wherein the spherical center has a hardness difference between a maximum hardness and a minimum hardness within the spherical center of less than 5 in JIS-C hardness, the envelope layer is formed from an envelope layer rubber composition containing (a) a base rubber, (b) an $\alpha,\beta$-unsaturated carboxylic acid having 3 to 8 carbon atoms and/or a metal salt thereof as a co-crosslinking agent, (c) an crosslinking initiator and (d) an acid and/or a salt thereof, and an outermost cover layer has a highest hardness among the constituent members of the golf ball.

The spherical center of the golf ball of the present invention has the hardness difference between the maximum hardness and minimum hardness within the spherical core of less than 5 in JIS-C hardness. The center having smaller hardness distribution increases the initial speed of the resultant golf ball on driver shots. Further, by forming the envelope layer around the spherical center, the spherical core has the outer-hard inner-soft structure. The spherical core with the outer-hard inner-soft structure reduces a spin rate on driver shots, thereby enhancing a flight distance. The outermost cover layer having a highest hardness among the constituent members of the golf ball also increases a flight distance on driver shots.

The present invention provides a golf ball traveling a great flight distance on driver shots.

BRIEF DESCRIPTION OF THE DRAWINGS

FIG. 1 is a partially cutaway view of the golf ball of the preferred embodiment of the present invention.

DESCRIPTION OF THE PREFERRED EMBODIMENT

The present invention is directed to a golf ball comprising a core composed of a spherical center and an envelope layer and at least one cover layer disposed outside the core, wherein the spherical center has a hardness difference between a maximum hardness and a minimum hardness within the spherical center of less than 5 in JIS-C hardness, the envelope layer is formed from an envelope layer rubber composition containing (a) a base rubber, (b) an $\alpha,\beta$-unsaturated carboxylic acid having 3 to 8 carbon atoms and/or a metal salt thereof as a co-crosslinking agent, (c) an crosslinking initiator and (d) an acid and/or a salt thereof, and an outermost cover layer has a highest hardness among the constituent members of the golf ball.

The golf ball of the present invention comprises a core composed of a spherical center and an envelope layer and at least one cover layer disposed outside the core. Hereinafter, the golf ball of the present invention will be described based on preferred embodiments with reference to the accompanying drawings accordingly.

FIG. 1 is a partially cutaway sectional view showing the golf ball 2 according to the preferable embodiment of the present invention. The golf ball 2 comprises a core 7 composed of a spherical center 4 and an envelope layer 6 disposed outside the spherical center 4, an inner cover 8 disposed outside the core 7, and an outermost cover layer 12 disposed outside the inner cover 8. A reinforcing layer 10 may be disposed between the inner cover 8 and the outermost cover layer 12 in order to improve adhesion between the inner cover 8 and the outermost cover layer 12. Plurality of dimples 14 are formed on a surface of the outermost cover layer 14. Other portions than dimples 14 on the surface of the outermost cover layer 12 are referred to as "land 16". The golf ball 2 is provided with a paint layer and a mark layer outside the cover, but these layers are not depicted.

The spherical center of the golf ball of the present invention has the hardness difference between the maximum hardness and minimum hardness within the spherical core of less than 5 in JIS-C hardness. The center having smaller hardness distribution increases the initial speed of the resultant golf ball on driver shots. From this aspect, the hardness difference between the maximum hardness and minimum hardness within the spherical core is preferably less than 4, more preferably less than 3. The hardness difference between the maximum hardness and minimum hardness within the spherical center is determined as follows. The spherical center is cut into two hemispheres to obtain a cut plane. The hardness of the spherical center were measured at the points determined by dividing an arbitrary radius of the spherical core by 2.0 mm to 2.5 mm interval to determine the maximum hardness, the minimum hardness and the difference therebetween.

The spherical center preferably has a center hardness (Ho) of 40 or more, more preferably 45 or more, and even more preferably 50 or more in JIS-C hardness. If the center hardness is 40 or more in JIS-C hardness, the resilience enhances. In light of suppressing the spin rate on driver shots, the center hardness is preferably 80 or less, more preferably 76 or less, and even more preferably 72 or less in JIS-C hardness.

The spherical center preferably has a diameter of 5 mm or more, more preferably 8 mm or more, and even more preferably 10 mm or more. If the diameter of the spherical center is 5 mm or more, the golf ball having an increased initial speed on driver shots is obtained. The diameter of the spherical center is preferably 30 mm or less, more preferably 28 mm or less, and even more preferably 25 mm or less. If the diameter of the spherical center is 30 mm or less, it is possible to enhance the degree of the outer-hard inner-soft of the core, thereby providing the golf ball having a low spin rate on driver shots.

The core of the golf ball of the present invention comprises the spherical center and the envelope layer disposed outside the spherical center. The envelope layer is preferably formed to cover the whole of the spherical center. The core preferably has a spherical shape.

The envelope layer preferably has a thickness of 3 mm or more, more preferably 4 mm or more, even more preferably 5 mm or more, and has a thickness of 18 mm or less, more preferably 16 mm or less, even more preferably 16 mm or less, even more preferably 14 mm or less. If the thickness of the envelope layer exceeds 18 mm, the diameter of the center becomes too small and thus the effect of enhancing the initial speed by the center is difficult to obtain. On the other hand, if the thickness of the envelope layer is less than 3 mm, the envelope layer becomes too thin and thus the effect of the outer-hard inner-soft structure is difficult to obtain.

The core preferably has a surface hardness (Hs) of 70 or more, more preferably 75 or more, even more preferably 80 or more in JIS-C hardness. If the surface hardness of the core is 70 or more in JIS-C hardness, the spin rate on driver shots is further decreased. In light of durability, the core preferably has a surface hardness of 96 or less, more preferably 94 or less, even more preferably 92 or less in JIS-C hardness.

The core preferably has a hardness difference (Hs−Ho) between a surface hardness thereof (Hs) (which is same as the surface hardness of the envelope layer) and a center hardness thereof (Ho) (same as the center hardness of the spherical center) of 18 or more, more preferably 19 or more, even more preferably 20 or more, and preferably has a hardness difference of 40 or less, more preferably 38 or less, even more preferably 36 or less in JIS-C hardness. The core with the outer-hard inner-soft structure lowers the spin rate on driver shots, thereby providing a great flight distance.

The spherical core preferably has a diameter of 36.0 mm or more, more preferably 37.0 mm or more, and even more preferably 38.0 mm or more. If the spherical core has the diameter of 36.0 mm or more, it is possible to strike a balance between the effect of lowering the spin rate by the outer-hard inner-soft structure and the effect of enhancing the resilience performance of the golf ball. The spherical core preferably has a diameter of 41.5 mm or less, more preferably 41 mm or less, and even more preferably 40.5 mm or less. If the spherical core has the diameter of 41.5 mm or less, the cover does not become too thin and thus the cover is molded more easily.

When the spherical core has a diameter from 36.0 mm to 41.5 mm, a compression deformation amount (shrinking deformation amount of the spherical core along the compression direction) of the spherical core when applying a load from 98 N as an initial load to 1275 N as a final load is preferably 2.0 mm or more, more preferably 2.2 mm or more, and is preferably 5.0 mm or less, more preferably 4.8 mm or less. If the compression deformation amount is 2.2 mm or more, the shot feeling of the golf ball becomes better. If the compression deformation amount is 5.0 mm or less, the resilience of the golf ball becomes better.

The golf ball of the present invention comprises at least one cover layer disposed outside the spherical core. The cover may be a single layer or two or more layers. The outermost cover layer of the golf ball of the present invention has a highest hardness among the constituent members of the golf ball. If the outermost cover layer has the highest hardness among the constituent members of the golf ball, the golf ball has the outer-hard inner-soft structure as a whole, and thus the spin rate on driver shots is decreased. As a result, the golf ball travels a great flight distance on driver shots. The constituent members of the golf ball means the spherical center, envelope layer, and inner covers except the outermost cover layer. In this light, a hardness difference between the outermost cover layer and the constituent member having the second highest hardness is preferably 2 or more, more preferably 6 or more, and even more preferably 8 or more in JIS-C hardness.

The hardness of the outermost cover layer is not limited, as long as the outermost cover layer has the highest hardness among the constituent members of the golf ball. The hardness of the outermost cover layer is preferably 83 or more, more preferably 84 or more, even more preferably 85 or more, and is preferably 96 or less, more preferably 95 or less, even more preferably 93 or less in JIS-C hardness.

The at least one cover layer has a thickness of 2.5 mm or less, more preferably 2.3 mm or less, and even more preferably 2.1 mm or less. If the thickness of the cover is 2.5 mm or less, the shot feeling becomes better. The cover preferably has a thickness of 0.3 mm or more, more preferably 0.5 mm or more, even more preferably 0.8 mm or more. If the cover is excessively thin, the durability and the wear resistance may deteriorate. If the cover has a plurality of layers, it is preferred that the total thickness of the cover layers falls within the above range.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or at least two of them may be used in combination.

The golf ball of the present invention may comprise a reinforcing layer disposed between the outermost cover layer and the inner cover disposed inside the outermost cover layer. The reinforcing layer adheres firmly to the inner cover as well as to the outermost cover layer. The reinforcing layer suppresses delamination of the outermost cover layer from the inner cover. In particular, when the golf ball with a thin cover is hit with an edge of a clubface, a wrinkle easily generates. The reinforcing layer suppresses the generation of the wrinkle.

When the golf ball of the present invention has a diameter from 40 mm to 45 mm, a compression deformation amount (shrinking deformation amount of the spherical core along the compression direction) of the golf ball when applying a load from 98 N as an initial load to 1275 N as a final load is preferably 1.8 mm or more, more preferably 2.0 mm or more, even more preferably 2.2 mm or more, most preferably 2.4 mm or more, and is preferably 4.8 mm or less, more preferably 4.6 mm or less. If the compression deformation amount is 1.8 mm or more, the shot feeling of the golf ball becomes better because the golf ball does not become too hard. On the other hand, if the compression deformation amount is 4.8 mm or less, the resilience of the golf ball improves.

A paint film is preferably formed on a surface of a golf ball body. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

The golf ball of the present invention includes, for example, a three-piece golf ball comprising a spherical core composed of a spherical center and an envelope layer and a single-layered cover disposed outside the spherical core; a four-piece golf ball comprising a spherical core composed of a spherical center and an envelope layer, an inner cover layer disposed outside the spherical core, and an outermost cover layer disposed outside the inner cover layer; a multi-piece golf ball (five-piece or more) comprising a spherical core composed of a spherical center and an envelope layer and three or more cover layers disposed outside of the spherical core.

Next, the materials constituting the golf ball of the present invention will be described. The spherical center of the golf ball of the present invention is preferably formed from a center resin composition containing a resin component, or a center rubber composition containing a rubber component. The center rubber composition includes a rubber composition containing (a) a base rubber, (b) a co-crosslinking agent, and (c) a crosslinking initiator. (a) The base rubber, (b) the co-crosslinking agent, and (c) the crosslinking initiator include the same components as those of an envelope layer rubber composition which will be described later. (e) A metal compound, (f) an organic sulfur compound, a filler, an antioxidant, a peptizing agent, or the like may be blended appropriately into the center rubber composition in addition to (a) the base rubber, (b) the co-crosslinking agent, and (c) the crosslinking initiator. As for the components, the same components as those of the envelope layer rubber composition which will be described later can be used. It is preferred that (d) the acid and/or the salt thereof described later is not blended into the center rubber composition.

Examples of the resin component contained in the center resin composition include, without any limitation, an ionomer resin; a thermoplastic polyamide elastomer having a commercial name of "Pebax (e.g. "Pebax 2533")" commercially available from Arkema K. K.; a thermoplastic polyester elastomer having a commercial name of "Hytrel (e.g. "Hytrel 3548", "Hytrel 4047")" commercially available from Du Pont-Toray Co., Ltd.; a thermoplastic polyurethane elastomer having a commercial name of "Elastollan" commercially available from BASF Japan Ltd; a thermoplastic styrene elastomer having a commercial name of "Rabalon" commercially available from Mitsubishi Chemical Corporation; and the like. These resin components may be used alone or as a mixture of at least two of them.

The resin component contained in the center resin composition preferably includes (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester.

(a-1) component is a nonionic binary copolymer composed of an olefin and an α,β-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and α,β-unsaturated carboxylic acid having 3 to 8 carbon atoms with a metal ion.

(a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. (a-4) component includes an ionomer resin prepared by neutralizing at least a part of carboxyl groups in the ternary copolymer composed of an olefin and α,β-unsaturated carboxylic acid having 3 to 8 carbon atoms, and an α,β-unsaturated carboxylic acid ester with a metal ion.

In the present invention, "(a-1) the binary copolymer composed of an olefin and an α,β-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an α,β-unsaturated carboxylic acid having 3 to 8 carbon atoms" is sometimes merely referred to as "the binary ionomer resin". "(a-3) The ternary copolymer composed of an olefin, an α,β-unsaturated carboxylic acid having 3 to 8 carbon atoms, and an α,β-unsaturated carboxylic acid ester" is sometimes merely referred to as "ternary copolymer". "(a-4) The ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes merely referred to as "the ternary ionomer resin".

The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Herein, (meth)acrylic acid means acrylic acid and/or methacrylic acid.

The content of the α,β-unsaturated carboxylic acid component having 3 to 8 carbon atoms in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the center composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of the binary copolymer include an ethylene-methacrylic acid copolymer such as "NUCREL (registered trademark) (e.g. NUCREL N1050H, NUCREL N2050H, NUCREL N1110H, NUCREL N200H) manufactured by Du Pont-Mitsui Polychemicals Co. Specific examples of the ternary copolymer include "NUCREL (registered trademark) (e.g. NUCREL AN4318, NUCREL AN4319) manufactured by Du Pont-Mitsui Polychemicals Co.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329(Zn))" commercially available from Du Pont-Mitsui Polychemicals Co., Ltd. Specific examples of the ternary ionomer resin include trade name "Himilan (registered trademark) (e.g. Himilan AM7327 (Zn), Himilan 1855 (Zn), Himilan 1856 (Na), Himilan AM7331 (Na)" commercially available from Du Pont-Mitsui Polychemicals Co., Ltd.

If the binary copolymer and ternary copolymer are used as the resin component, a metal compound may be blended. As the metal compound, (e) the metal compound used for the envelope layer rubber composition can be exemplified.

The center resin composition may further include an anionic surfactant having an anionic part and containing sulfur; an amphoteric surfactant having a cationic part and anionic part; a basic metal salt of a fatty acid; or the like. The resultant spherical center has a higher resilience.

The anionic surfactant containing sulfur, for example, preferably includes an anionic surfactant having an S=O bond, and more preferably includes an anionic surfactant such as a sulfate (salt of sulfuric acid), sulfonate (salt of sulfonic acid), or the like. Specific examples of the anionic surfactant containing sulfur include ester sulfates such as alkyl ester sulfate, polyoxyethylene polycyclic phenyl ether sulfate, polyoxyethylene alkyl ether sulfate, polyoxyethylene aryl ether sulfate, and polyoxyethylene castor-oil ether sulfate; and sulfonic acids and/or salts thereof such as an alkylbenzene sulfonic acid and/or a salt thereof, an alkylene disulfonic acid and/or a salt thereof, a monoalkylsulfosuccinic acid and/or a salt thereof, a dialkylsulfosuccinic acid and/or a salt thereof, an alkyldiphenyl ether disulfonic acid and/or a salt thereof, an alkane sulfonic acid and/or a salt thereof, and salts of naphthalenesulfonic acid formalin condensate.

The sulfate or sulfonate includes: salts of alkali metals such as sodium, potassium, or the like; salts of divalent metals such as magnesium, calcium, or the like; and ammonium salts such as ammonia, triethanolamine, or the like. Although the anionic surfactant containing sulfur used in the present invention preferably includes a salt which is neutralized, the anionic surfactant containing sulfur may be a free acid such as a sulfonic acid, which can be easily dissociated to form an anion.

The alkyl sulfate includes, for example, sodium lauryl sulfate, higher alcohol sodium sulfate, triethanolamine lauryl sulfate, and ammonium lauryl sulfate. The polyoxyethylene alkyl ether sulfate includes, for example, sodium lauryl polyoxyethylene ether sulfate, sodium polyoxyethylene alkyl ether sulfate, and triethanolamine polyoxyethylene alkyl ether sulfate. The alkylbenzene sulfonic acid and/or a salt thereof includes dodecylbenzene sulfonic acid, sodium dodecylbenzene sulfonate, and the like.

In the present invention, a dialkylsulfosuccinic acid and/or a salt thereof is preferably used as the anionic surfactant containing sulfur. The carbon number of the alkyl group of the dialkylsulfosuccinic acid and/or the salt thereof is preferably 3 or larger, and more preferably 5 or larger, and is preferably 30 or smaller, and more preferably 28 or smaller. If the carbon number of the alkyl group is within the above described range, the mobility of a molecular chain increases, and the resilience of the composition increases while maintaining the flexibility thereof. Furthermore, two of the alkyl groups may be identical or may be different from each other. The dialkylsulfosuccinic acid and/or the salt thereof includes for example, di(2-ethylhexyl)sulfosuccinic acid, sodium di(2-ethylhexyl)sulfosuccinate, magnesium di(2-ethylhexyl) sulfosuccinate, or the like.

The amphoteric surfactant is a surfactant having a cationic part and anionic part within a molecule thereof, and examples thereof include a betaine type amphoteric surfactant such as alkylbetaine type, amidobetaine type, imidazoliumbetaine type, alkylsulfobetain type, amidosulfobetain type, and the like; amidoamino acid type amphoteric surfactant and alkylamino fatty acid salt; alkylamine oxide; β-alanine type amphoteric surfactant and glycine type amphoteric surfactant; sulfobetaine type amphoteric surfactant; phosphobetaine type amphoteric surfactant; and the like.

Specific examples of the amphoteric surfactant are dimethyllaurylbetaine, oleylbetaine, dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethyloctylamine oxide, N,N-dimethyllaurylamine oxide, N,N-dimethylstearylamine oxide, and the like.

The content of the anionic surfactant containing sulfur or the amphoteric surfactant is preferably 1 part by mass or more, more preferably 3 parts by mass or more, even more preferably 10 parts by mass or more, and is preferably 200 parts by mass or less, more preferably 150 parts by mass or less, even more preferably 100 parts by mass or less with respect to 100 parts by mass of the resin component.

The basic metal salt of the fatty acid is obtained by a well-known producing method where a fatty acid is allowed to react with a metal oxide or metal hydroxide. A general metal salt of a fatty acid is obtained by a reaction of a fatty acid with a metal oxide or metal hydroxide in an amount of the reaction equivalent, whereas a basic metal salt of a fatty acid is obtained by adding a metal oxide or metal hydroxide in an excessive amount which is larger than the reaction equivalent to a fatty acid. The metal content, melting point or the like of the product are different from those of a general metal salt of a fatty acid.

The basic metal salt of the fatty acid is preferably a basic metal salt of a saturated fatty acid. The basic metal salt of the fatty acid is preferably a basic metal salt of a fatty acid having 4 to 22 carbon atoms, and more preferably basic metal salt of a fatty acid having 5 to 18 carbon atoms. Specific examples of the basic metal salt of the fatty acid include basic magnesium caprylate, basic calcium caprylate, basic zinc caprylate, basic magnesium laurate, basic calcium laurate, basic zinc laurate, basic magnesium myristate, basic calcium myristate, basic zinc myristate, basic magnesium palmitate, basic calcium palmitate, basic zinc palmitate, basic magnesium oleate, basic calcium oleate, basic zinc oleate, basic magnesium stearate, basic calcium stearate, basic zinc stearate, basic magnesium 12-hydroxystearate, basic calcium 12-hydroxystearate, basic zinc 12-hydroxystearate, basic magnesium behenate, basic calcium behenate, and basic zinc behenate. The basic metal salt of the fatty acid preferably includes basic zinc fatty acid, and more preferably basic zinc stearate, basic zinc laurate, and basic zinc caprylate. The basic metal salt of the fatty acid may be used alone or as a mixture of at least two of them.

The content of the basic metal salt of the fatty acid is preferably 25 parts by mass or more, more preferably 33 parts by mass or more, even more preferably 50 parts by mass or more, and is preferably 100 parts by mass or less with respect 100 parts by mass of the resin component.

The envelope layer of the golf ball of the present invention is formed from an envelope layer rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an acid and/or a salt thereof. The envelope layer formed from the envelope layer rubber composition has hardness distribution where a hardness tends to increase from the side of the surface of the spherical center toward the side of the surface of the core.

The reason why the hardness of the envelop layer increases from the side of the surface of the center toward the side of the surface of the core is considered as follows. The metal salt of (b) the α,β-unsaturated carboxylic acid having 3 to 8 carbon atoms blended in the envelop layer rubber composition is considered to form an ion cluster in the envelop layer, thereby crosslinking the rubber molecules with metals. By blending (d) the acid and/or the salt thereof into this envelop layer rubber composition, (d) the acid and/or the salt thereof exchanges a cation with the ion cluster formed by the metal salt of (b) the α,β-unsaturated carboxylic acid having 3 to 8 carbon atoms, thereby breaking the metal crosslinking by the metal salt of the α,β-unsaturated carboxylic acid having 3 to 8 carbon atoms. This cation exchange reaction easily occurs at the side of the center surface, and less occurs toward the side of the core surface. When molding the core, the internal temperature of the envelop layer is high at the side of the center surface and decreases toward the core surface, since reaction heat from a crosslinking reaction of the base rubber accumulates at the side of the center surface. In other words, the breaking of the metal crosslinking by (d) the acid and/or the salt thereof easily occurs at the side of the center surface, but less occurs toward the side of the core surface. As a result, it is conceivable that since a crosslinking density in the core increases from the side of the center surface toward the side of the core surface, the core hardness increases from the side of the center surface toward the side of the core surface.

(a) The base rubber used in the present invention will be explained. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having a cis-1,4 bond in a proportion of 40% or more, more preferably 80% or more, even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene is preferably one synthesized using a rare earth element catalyst. When a neodymium catalyst, which employs a neodymium compound which is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the co-crosslinking agent will be described. (b) The co-crosslinking agent includes (b1) an α,β-unsaturated carboxylic acid having 3 to 8 carbon atoms and/or (b2) a metal salt of the α,β-unsaturated carboxylic acid having 3 to 8 carbon atoms. Hereinafter, (b1) the α,β-unsaturated carboxylic acid having 3 to 8 carbon atoms and/or (b2) the metal salt thereof sometimes may be merely referred to as "(b) the α,β-unsaturated carboxylic acid having 3 to 8 carbon atoms and/or a metal salt thereof". (b) The α,β-unsaturated carboxylic acid having 3 to 8 carbon atoms and/or a metal salt thereof is blended as a co-crosslinking agent in the rubber composition and has an action of crosslinking a rubber molecule by graft polymerization to a base rubber molecular chain. In the case that the envelop layer rubber composition used in the present invention contains only the α,β-unsaturated carboxylic acid having 3 to 8 carbon atoms as the co-crosslinking agent, the envelope layer rubber composition preferably contains (f) a metal compound which will be described later. Neutralizing (b-1) the α,β-unsaturated carboxylic acid having 3 to 8 carbon atoms with (f) the metal compound in the rubber composition provides substantially the same effect as using the metal salt of the α,β-unsaturated carboxylic acid having 3 to 8 carbon atoms. Further, in the case of using (b2) the α,β-unsaturated carboxylic acid having 3 to 8 carbon atoms and the metal salt thereof in combination, (f) the metal compound may be used.

(b1) The α,β-unsaturated carboxylic acid having 3 to 8 carbon atoms includes, for example, acrylic acid, methacrylic acid, fumaric acid, maleic acid, crotonic acid, and the like.

Examples of (b2) the metals constituting the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum ion or the like; and other metal ions such as tin, zirconium or the like. The above metal ions can be used solely or as a mixture of at least two of them. Among these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal sat, zinc acrylate is preferable, because zinc acrylate enhances the resilience of the resultant golf ball. (b) The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 40 parts by mass or less, with respect to 100 parts by mass of (a) the base rubber. If the content of (b) the α,β-unsaturated carboxylic acid having 3 to 8 carbon atoms and/or the metal salt thereof is less than 10 parts by mass, the content of (c) the crosslinking initiator which will be described below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

Next, (d) the acid and/or the salt thereof will be described. It is considered that (d) the acid and/or the salt thereof has an action of breaking the metal crosslinking by the metal salt of the α,β-unsaturated carboxylic acid having 3 to 8 carbon atoms and/or the metal salt thereof in the envelope layer, when molding the envelope layer.

(d) The acid and/or the salt thereof may include any one of an aliphatic acid and/or a salt thereof and an aromatic acid and/or a salt thereof, as long as it exchanges the cation component with the metal salt of the α,β-unsaturated carboxylic acid having 3 to 8 carbon atoms. The acid and/or the salt thereof preferably includes a protonic acid and/or a salt thereof. The protonic acid includes oxo acids such as a carboxylic acid, a sulfonic acid, and a phosphoric acid; and hydroacids such as hydrochloric acid, hydrofluoric acid or the like. Preferred of the acids is an oxo acid, more preferred is a carboxylic acid. That is, (d) the acid and/or the salt thereof preferably includes a carboxylic acid and/or a salt thereof.

(d) The carboxylic acid and/or the salt thereof may include any one of an aliphatic carboxylic acid (sometimes may be merely referred to as "fatty acid" in the present invention) and/or a salt thereof and an aromatic carboxylic acid and/or a salt thereof: however, preferred is the aliphatic carboxylic acid and/or the salt thereof. The carboxylic acid and/or the salt thereof preferably includes a carboxylic acid having 1 to 30 carbon atoms and/or a salt thereof, more preferably a carboxylic acid having 4 to 30 carbon atoms and/or a salt thereof, even more preferably a carboxylic acid having 5 to 25 carbon atoms and/or a salt thereof. In (d) the carboxylic acid and/or the salt thereof, (b) the α,β-unsaturated carboxylic acid having 3 to 8 carbon atoms and/or the metal salt thereof used as the co-crosslinking agent is not included.

The fatty acid may be either a saturated fatty acid or an unsaturated fatty acid; however, a saturated fatty acid is preferable. Specific examples (IUPAC nomenclature) of the fatty acids are methanoic acid (C1), ethanoic acid (C2), propanoic acid (C3), butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples (IUPAC nomenclature) of the fatty acid are ethenoic acid (C2), propenoic acid (C3), butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples (common name) of the fatty acid are formic acid (C1), acetic acid (C2), propionic acid (C3), butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxy stearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Among these, preferred fatty acids are caprylic acid, capric acid, lauric acid, myristic acid, palmitic acid, stearic acid, behenic acid, or oleic acid.

There is no particular limitation on the aromatic carboxylic acid, as long as it is a compound that has an aromatic ring and a carboxyl group. Specific examples of the aromatic carboxylic acids include, for example, benzoic acid (C7), phthalic acid (C8), isophthalic acid (C8), terephthalic acid (C8), hemimellitic acid (benzene-1,2,3-tricarboxylic acid) (C9), trimellitic acid (benzene-1,2,4-tricarboxylic acid) (C9), trimesic acid (benzene-1,3,5-tricarboxylic acid) (C9), mellophanic acid (benzene-1,2,3,4-tetracarboxylic acid) (C10), prehnitic acid (benzene-1,2,3,5-tetracarboxylic acid) (C10), pyromellitic acid (benzene-1,2,4,5-tetracarboxylic acid) (C10), mellitic acid (benzene hexacarboxylic acid) (C12), diphenic acid (biphenyl-2,2'-dicarboxylic acid) (C12), toluic acid (methylbenzoic acid) (C8), xylic acid (C9), prehnitylic acid (2,3,4-trimethylbenzoic acid) (C10), γ-isodurylic acid (2,3,5-trimethylbenzoic acid) (C10), durylic acid (2,4,5-trimethylbenzoic acid) (C10), β-isodurylic acid (2,4,6-trimethylbenzoic acid) (C10), α-isodurylic acid (3,4,5-trimethylbenzoic acid) (C10), cuminic acid (4-isopropylbenzoic acid) (C10), uvitic acid (5-methylisophthalic acid) (C9), α-toluic acid (phenylacetic acid) (C8), hydratropic acid (2-phenylpropanoic acid) (C9), and hydrocinnamic acid (3-phenylpropanoic acid) (C9).

Furthermore, examples of the aromatic carboxylic acids substituted with a hydroxyl group, an alkoxy group, or an oxo group include, for example, salicylic acid (2-hydroxybenzoic acid) (C7), anisic acid (methoxybenzoic acid) (C8), cresotinic acid (hydroxy(methyl)benzoic acid) (C8), o-homosalicylic acid (2-hydroxy-3-methylbenzoic acid) (C8), m-homosalicylic acid (2-hydroxy-4-methylbenzoic acid) (C8), p-homosalicylic acid (2-hydroxy-5-methylbenzoic acid) (C8), o-pyrocatechuic acid (2,3-dihydroxybenzoic acid) (C7), β-resorcylic acid (2,4-dihydroxybenzoic acid) (C7), γ-resorcylic acid (2,6-dihydroxybenzoic acid) (C7), protocatechuic acid (3,4-dihydroxybenzoic acid) (C7), α-resorcylic acid (3,5-dihydroxybenzoic acid) (C7), vanillic acid (4-hydroxy-3-methoxybenzoic acid) (C8), isovanillic acid (3-hydroxy-4-methoxybenzoic acid) (C8), veratric acid (3,4-dimethoxybenzoic acid) (C9), o-veratric acid (2,3-dimethoxybenzoic acid) (C9), orsellinic acid (2,4-dihydroxy-6-methylbenzoic acid) (C8), m-hemipinic acid (4,5-dimethoxyphthalic acid) (C10), gallic acid (3,4,5-trihydroxybenzoic acid) (C7), syringic acid (4-hydroxy-3,5-dimethoxybenzoic acid) (C9), asaronic acid (2,4,5-trimethoxybenzoic acid) (C10), mandelic acid (hydroxy (phenyl)acetic acid) (C8), vanilmandelic acid (hydroxy(4-hydroxy-3-methoxy phenyl)acetic acid) (C9), homoanisic acid ((4-methoxy phenyl)acetic acid) (C9), homogentisic acid ((2,5-dihydroxyphenyl)acetic acid) (C8), homoprotocatechuic acid ((3,4-dihydroxyphenyl)acetic acid) (C8), homovanillic acid ((4-hydroxy-3-methoxy phenyl)acetic acid) (C9), homoisovanillic acid ((3-hydroxy-4-methoxy phenyl)acetic acid) (C9), homoveratric acid ((3,4-dimethoxy phenyl)acetic acid) (C10), o-homoveratric acid ((2,3-dimethoxy phenyl)acetic acid) (C10), homophthalic acid (2-(carboxymethyl)benzoic acid) (C9), homoisophthalic acid (3-(carboxymethyl)benzoic acid) (C9), homoterephthalic acid (4-(carboxymethyl)benzoic acid) (C9), phthalonic acid (2-(carboxycarbonyl)benzoic acid) (C9), isophthalonic acid (3-(carboxycarbonyl)benzoic acid) (C9), terephthalonic acid (4-(carboxycarbonyl)benzoic acid) (C9), atrolactic acid (2-hydroxy-2-phenylpropanoic acid) (C9), tropic acid (3-hydroxy-2-phenylpropanoic acid) (C9), melilotic acid (3-(2-hydroxyphenyl)propanoic acid) (C9), phloretic acid (3-(4-hydroxy phenyl)propanoic acid) (C9), hydrocaffeic acid (3-(3,4-dihydroxyphenyl) propanoic acid) (C9), hydroferulic acid (3-(4-hydroxy-3-methoxy phenyl)propanoic acid) (C10), hydroisoferulic acid (3-(3-hydroxy-4-methoxy phenyl)propanoic acid) (C10), p-coumaric acid (3-(4-hydroxy phenyl)acrylic acid) (C9), umbellic acid (3-(2,4-dihydroxyphenyl)acrylic acid) (C9), caffeic acid (3-(3,4-dihydroxyphenyl)acrylic acid) (C9), ferulic acid (3-(4-hydroxy-3-methoxy phenyl)acrylic acid) (C10), isoferulic acid (3-(3-hydroxy-4-methoxy phenyl)acrylic acid) (C10), and sinapic acid (3-(4-hydroxy-3,5-dimethoxy phenyl)acrylic acid) (C11).

The cation component of (d) the salt of the acid may be any one of a metal ion, an ammonium ion and an organic cation. The metal ion includes monovalent metal ions such as sodium, potassium, lithium, silver and the like; divalent metal ions such magnesium, calcium, zinc, barium, cadmium, copper, cobalt, nickel, manganese and the like; trivalent metal ions such as aluminum, iron and the like; and other ions such as tin, zirconium, titanium and the like. Zinc ion is preferred as the cation component of the salt of the carboxylic acid. These cation components may be used alone or as a mixture of at least two of them.

The organic cation includes a cation having a carbon chain. The organic cation includes, for example, without limitation, an organic ammonium ion. Examples of the organic ammonium ion are: primary ammonium ions such as stearyl ammonium ion, hexyl ammonium ion, octyl ammonium ion, 2-ethyl hexyl ammonium ion or the like; secondary ammonium ions such as dodecyl (lauryl) ammonium ion, octadecyl (stearyl) ammonium ion or the like; tertiary ammonium ions such as trioctyl ammonium ion or the like; and quaternary ammonium ion such as dioctyldimethyl ammonium ion, distearyldimethyl ammonium ion or the like. These organic cations may be used alone or as a mixture of at least two of them. The carbon number of the salt of the carboxylic acid is the carbon number of the carboxylic acid component, and the carbon number of the organic cation is not included.

The content of (d) the acid and/or the salt thereof is preferably 1.0 part by mass or more, more preferably 1.5 part by mass or more, even more preferably 2.0 parts by mass or more, and is preferably less than 40 parts by mass, more preferably 38 parts by mass or less, even more preferably 36 parts by mass or less with respect to 100 parts by mass of (a) the base rubber. If the content is too little, the effect of adding (d) the acid and/or the salt thereof is not sufficient, and thus the hardness distribution of the envelope layer may be small. If the content is too much, the resilience of the core may be lowered, since the hardness of the resultant envelope layer may be lowered as a whole.

There are cases where the surface of zinc acrylate used as the co-crosslinking agent is treated with (d) the acid and/or the salt thereof to improve the dispersibility to the rubber. In the case of using zinc acrylate whose surface is treated with (d) the acid and/or the salt thereof, in the present invention, the amount of (d) the acid and/or the salt thereof used as a surface treating agent is not included in the content of (d) component. It is considered that (d) the acid and/or the salt thereof used as a surface treating hardly contribute to the cation exchange reaction with (b) the co-crosslinking agent.

The content of (d) the acid and/or the salt thereof is preferably determined depending upon the kind and the combination of the acid and/or the salt thereof. Particularly, the content of (d) the acid and/or the salt thereof is preferably determined by the carbon number and the combination of the acid and/or the salt thereof. It is conceivable that the action of breaking the metal crosslinking by (d) the acid and/or the salt thereof is affected by the number of moles of the acid and/or the salt thereof to be added. Concurrently, the acid and/or the salt thereof acts as a plasticizer for the envelope layer. If the blending amount (mass) of (d) the acid and/or the salt thereof to be added increases, the envelope layer is softened as a whole. This plasticizing effect is affected by the blending amount (mass) of the acid and/or the salt thereof to be added. In view of those actions, on the same blending amount (mass), the number of moles of the acid and/or the salt thereof to be added is made larger by using the acid and/or the salt thereof having less carbon atoms (small molecular weight) compared to using the acid and/or the salt thereof having larger carbon atoms (large molecular weight). That is, the acid and/or the salt thereof having less carbon atoms can enhance the effect of breaking the metal crosslinking, while suppressing softening the entire envelope layer as a whole by the plasticizing effect.

For example, if a carboxylic acid having 1 to 14 carbon atoms and/or a salt thereof is used as (d) the acid and/or the salt thereof, the content of the carboxylic acid having 1 to 14 carbon atoms and/or the salt thereof is preferably 1.0 part by mass or more, more preferably 1.2 parts by mass or more, even more preferably 1.4 parts by mass or more, and is preferably 20 parts by mass or less, more preferably 18 parts by mass or less, even more preferably 16 parts by mass or less with respect to 100 parts by mass of (a) the base rubber. The carbon number of the salt of the carboxylic acid having 1 to 14 carbon atoms is the carbon number of the carboxylic acid component, and the carbon number of the organic cation is not included.

For example, if a carboxylic acid having 15 to 30 carbon atoms and/or a salt thereof is used as (d) the acid and/or the salt thereof, the content of the carboxylic acid having 15 to 30 carbon atoms and/or the salt thereof is preferably 5 parts by mass or more, more preferably 6 parts by mass or more, even more preferably 7 parts by mass or more, and is preferably less than 40 parts by mass, more preferably 35 parts by mass or less, even more preferably 30 parts by mass or less with respect to 100 parts by mass of (a) the base rubber. The carbon number of the salt of the carboxylic acid having 15 to 30 carbon atoms is the carbon number of the carboxylic acid component, and the carbon number of the organic cation is not included.

The envelope layer rubber composition preferably further contains (e) an organic sulfur compound. By using (d) the acid and/or the salt thereof and (e) the organic sulfur compound in combination for the envelope layer rubber composition, the degree of the outer-hard and inner-soft structure is further promoted. (e) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, —S-M-S—, —S-M-S—S—, —S—S-M-S—S—, —S-M-S—S—S—, or the like; M is a metal atom). Furthermore, (e) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds.

(e) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the core, (e) the organic sulfur compound preferably includes, organic compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel(II), zirconium(II), and tin (II).

Examples of the thiophenols include, for example, thiophenol; thiophenols substituted with a fluoro group, such as 4-fluorothiophenol, 2,5-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,4,5-triiodothiophenol, 2,4,5,6-tetraiodothiophenol, pentaiodothiophenol and the like; or a metal salt thereof. As the metal salt, zinc salt is preferred.

Examples of the thionaphthols are 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, and 1-acetyl-2-thionaphthol and metal salts thereof. Preferable examples include 1-thionaphthol, 2-thionaphthol and zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl)mercaptobenzothiazole, and 2-(2,6-diethyl-4-morpholinothio)benzothiazole.

(e) The organic sulfur compound can be used solely or as a mixture of at least two of them.

The content of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (e) the organic sulfur compound is less than 0.05 part by mass, the effect of adding (e) the organic sulfur compound cannot be obtained and thus the resilience may not improve. If the content of (e) the organic sulfur compound exceeds 5.0 parts by mass, the compression deformation amount of the obtained golf ball becomes large and thus the resilience may be lowered.

The envelope layer rubber composition used in the present invention may include additives such as a pigment, a filler for adjusting weight or the like, an antioxidant, a peptizing agent, and a softener where necessary. Further, as described above, if the envelope layer rubber composition used in the present invention contains only (b1) the $\alpha,\beta$-unsaturated carboxylic acid having 3 to 8 carbon atoms as a co-crosslinking agent, the envelope layer rubber composition preferably contains (f) the metal compound.

(f) The metal compound is not limited as long as it can neutralize (b1) the $\alpha,\beta$-unsaturated carboxylic acid having 3 to 8 carbon atoms in the envelope layer rubber composition. (f) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (f) the metal compound preferably includes a divalent metal compound, more preferably includes a zinc compound. The divalent metal compound reacts with (b1) the $\alpha,\beta$-unsaturated carboxylic acid having 3 to 8 carbon atoms, thereby forming a metal crosslinking. Use of the zinc compound provides a golf ball with excellent resilience. (f) These metal compounds are used solely or as a mixture of at least two of them. The content of (f) the metal compound is preferably determined depending upon the desired degree of neutralization of (b) the $\alpha,\beta$-unsaturated carboxylic acid having 3 to 8 carbon atoms.

Examples of the pigment blended in the envelope layer rubber composition include a white pigment, a blue pigment, and a purple pigment. As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the envelope layer rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the envelope layer rubber composition is used as a weight adjusting agent for mainly adjusting the weight of the golf ball obtained as a final product. The filler may be blended where necessary. The filler includes, for example, inorganic fillers such as zinc oxide, barium sulfate, calcium carbonate, magnesium oxide, tungsten powder, molybdenum powder, or the like. The filler preferably includes zinc oxide. It is conceivable that zinc oxide functions as a vulcanization accelerator to enhance the hardness of the spherical core as a whole. The content of the filler is preferably 0.5 part by mass or more, more preferably 1 part by mass or more, and is preferably 30 parts by mass or less, more preferably 25 parts by mass or less, even more preferably 20 parts by mass or less with respect to 100 parts by mass of the base rubber. If the content of the filler is less than 0.5 part by mass, it is difficult to adjust the weight, while if the content of the filler exceeds 30 parts by mass, the weight ratio of the rubber component is reduced and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The golf ball cover of the present invention is formed from a cover composition containing a resin component. Examples of the resin component include, for example, an ionomer rein; a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047") commercially available from Du Pont-Toray Co., Ltd.; a thermoplastic polyurethane elastomer having a commercial name of "Elastollan (registered trademark)" commercially available from BASF Japan Ltd; and a thermoplastic styrene elastomer having a commercial name of "Rabalon (registered trademark)" commercially available from Mitsubishi Chemical Corporation; and the like. These resin components may be used alone or as a mixture of at least two of them.

The ionomer resin includes a product prepared by neutralizing at least a part of carboxyl groups in the binary copolymer composed of an olefin and an $\alpha,\beta$-unsaturated carboxylic acid having 3 to 8 carbon atoms with a metal ion, a product prepared by neutralizing at least a part of carboxyl groups in the ternary copolymer composed of an olefin, an α,β-unsaturated carboxylic acid having 3 to 8 carbon atoms, and an α,β-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes the metal ion-neutralized product of the binary copolymer composed of ethylene-(meth)acrylic acid and the metal ion-neutralized product of the ternary copolymer composed of ethylene, (meth)acrylic acid, and (meth)acrylic acid ester.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins. The ionomer resins may be used solely or as a mixture of at least two of them.

The cover composition constituting the cover of the golf ball of the present invention preferably includes, as a resin component, a thermoplastic polyurethane elastomer or an ionomer rein. The content of the polyurethane or ionomer resin in the resin component of the cover composition is preferably 50 mass % or more, more preferably 60 mass % or more, and even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the effect of the present invention.

The amount of the white pigment (for example, titanium oxide) is preferably 0.5 part or more, more preferably 1 part or more, and the content of the white pigment is preferably 10 parts or less, more preferably 8 parts or less, with respect to 100 parts of the resin component constituting the cover by mass. If the amount of the white pigment is 0.5 part by mass or more, it is possible to impart the opacity to the resultant cover. Further, if the amount of the white pigment is more than 10 parts by mass, the durability of the resultant cover may deteriorate.

The golf ball of the present invention may have a reinforcing layer between the outermost cover layer and the inner cover disposed inside the outermost cover layer. The reinforcing layer is formed from a reinforcing layer composition containing a resin component. As the resin component, a two-component curing type thermosetting resin is preferably used. Example of two-component curing type thermosetting resin include epoxy resins, urethane resins, acrylic resins, polyester resins and cellulose resins. In light of the strength and durability of the reinforcing layer, two-component curing type epoxy resins and two-component curing type urethane resins are preferred.

A reinforcing layer composition may include additives such as a coloring agent (for example, titanium dioxide), a phosphoric acid-based stabilizer, an antioxidant, a light stabilizer, a fluorescent brightener, an ultraviolet absorber, an anti-blocking agent and the like. The additives may be added to either the base material or the curing agent of the two-component curing thermosetting resin.

Next, the process for producing the golf ball of the present invention will be described. The spherical center is prepared using the center rubber composition or the center resin composition. If the spherical center is formed from the center rubber composition, the spherical center is obtained by heating and molding the kneaded center rubber composition in the mold. The temperature for press-molding into the spherical center is preferably 120° C. or more, more preferably 150° C. or more, even more preferably 160° C. or more, and is preferably 170° C. or less. The pressure for press-molding preferably ranges from 2.9 MPa to 11.8 MPa. The time for press-molding is preferably from 10 minutes to 60 minutes.

If the spherical center is formed from the center resin composition, the spherical center is molded by injection molding the center resin composition. Specifically, the center resin composition heated and melted at the temperature ranging from 60° C. to 260° C. is charged into molds clamped under the pressure of 1 MPa to 100 MPa for 1 second to 100 seconds, and after cooling for 30 seconds to 300 seconds, the molds are opened.

The envelope layer rubber composition is obtained by mixing and kneading (a) the base rubber, (b) the α,β-unsaturated carboxylic acid having 3 to 8 carbon atoms and/or the metal salt thereof, (c) the crosslinking initiator, and (d) the acid and/or the salt thereof, and other additives where necessary. The kneading can be conducted, without any limitation, with a well-known kneading machine such as a kneading roll, a banbury mixer, a kneader, or the like.

An embodiment for molding an envelope layer is not particularly limited, and includes an embodiment which comprises molding the envelope layer rubber composition into a hollow-shell, covering the spherical center with a plurality of the hollow-shells and subjecting the spherical center with a plurality of the hollow shells to the compression-molding (preferably an embodiment which comprises molding the envelope layer rubber composition into a half hollow-shell, covering the spherical center with the two half hollow-shells, and subjecting the core with the two half hollow-shells to the compression-molding). The compression-molding of the envelope layer rubber composition into half shell can be carried out, for example, under a pressure of 1 MPa or more and 20 MPa or less at a temperature of 10° C. or more and 100° C. or less. Examples of a method for molding the envelope layer using half shells include compression molding by covering the spherical center with two half shells. The compression molding of half shells into the envelope layer can be carried out, for example, under a pressure of 2 MPa or more and 25 MPa or less at a temperature of 100° C. or more and 200° C. or less. By performing the molding under the above conditions, the envelope layer having a uniform thickness can be formed.

An embodiment for molding a cover is not particularly limited, and includes an embodiment which comprises injection molding the cover composition directly onto the spherical core, or an embodiment which comprises molding the cover composition into a hollow-shell, covering the spherical core with a plurality of the hollow-shells and subjecting the spherical core with a plurality of the hollow shells to the compression-molding (preferably an embodiment which comprises molding the cover composition into a half hollow-shell, covering the spherical core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of –20° C. or more and 70° C. or less relative to the flow beginning temperature of the cover composition. By performing the molding under the above conditions, a half shell having a uniform thickness can be formed. The compression molding of half shells into the cover can be carried out, for example, under a pressure of 0.5 MPa or more and 25 MPa or less at a temperature of –20° C. or more and 70° C. or less relative to the flow beginning temperature of the cover composition. By performing the molding under the above conditions, a golf ball cover having a uniform thickness can be formed.

In the case of directly injection molding the cover composition, the cover composition extruded in the pellet form beforehand may be used for injection molding or the materials such as the base resin components and the pigment may be dry blended, followed by directly injection molding the blended material. It is preferred to use upper and lower molds having a spherical cavity and pimples, wherein a part of the pimples also serves as a retractable hold pin. When molding the cover by injection molding, the hold pin is protruded, the core is placed and held with the protruded hold pin, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Compression Deformation Amount (mm)

A compression deformation amount of the core or golf ball (a shrinking amount of the core or golf ball in the compression direction thereof), when applying a load from 98 N as an initial load to 1275 N as a final load to the core or golf ball, was measured.

(2) Slab Hardness (Shore D Hardness)

Sheets with a thickness of about 2 mm were produced by press molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Hardness Distribution of Spherical Core (Spherical Center) (JIS-C Hardness)

A type P1 auto loading durometer manufactured by Kobunshi Keiki Co., Ltd., provided with a JIS-C type spring hardness tester was used to measure the hardness of the spherical core. The JIS-C hardness measured at the surface of the spherical core was adopted as the surface hardness of the spherical core. The spherical core was cut into two hemispheres to obtain a cut plane, and the JIS-C hardness were measured at predetermined points. The hardness were measured at the points determined by dividing an arbitrary radius of the spherical core by 2.0 mm to 2.5 mm interval to determine the maximum hardness and the minimum hardness within the spherical core, from which the hardness difference therebetween is calculated.

(4) Flight Distance (m), Initial Speed and Spin Rate (Rpm) on a Driver Shot

A titanium-headed driver (XXIO S, loft: 11°, manufactured by Dunlop Sports O., Ltd.) was installed on a swing robot M/C manufactured by True temper Sports. The golf balls were hit at a head speed of 40 m/sec, and the spin rate and initial speed immediately after hitting the golf balls and the flight distance (the distance from the launch point to the stop point) were measured. This measurement was conducted ten times for each golf ball, and the average value was adopted as the measurement value for the golf ball. A sequence of photographs of the hit golf balls were taken for measuring the spin rate (rpm) right after hitting the golf ball.

[Production of Cores]
(1) Preparation of Spherical Center

Center Resin Composition

The blending materials shown in Table 3 were dry blended, followed by mixing with a twin-screw kneading extruder to extrude the blended material in the strand form into the chilled water. The extruded strand was cut with a pelletizer to prepare a center resin composition in the form of pellet. Extrusion was conducted in the following conditions: screw diameter=45 mm; screw revolutions=200 rpm; and screw L/D=35. The mixtures were heated to a temperature in a range from 160° C. to 230° C. at a die position of the extruder. The obtained center resin composition in the form of pellet was injection molded at a temperature of 220° C. to prepare a spherical center.

Center Rubber Composition

The rubber compositions having formulations shown in Table 3 were kneaded and heat-pressed in upper and lower molds, each having a hemispherical cavity, at 170° C. for 20 minutes to prepare the spherical centers.

TABLE 3

| Center composition No. | J1 | J2 | J3 | J4 | J5 | J6 |
|---|---|---|---|---|---|---|
| Himilan AM7327 | 100 | — | — | — | — | — |
| Nucrel AN4319 | — | 100 | 100 | 100 | — | — |
| Basic Mg oleate (metal content: 1.4 mol %) | 25 | — | — | — | — | — |
| Basic Mg oleate (metal content: 1.7 mol %) | — | 25 | — | — | — | — |
| Magnesium hydroxide | — | — | 5.1 | 6 | — | — |
| Oleylbetaine | — | — | 70 | 30 | — | — |
| Polybutadiene rubber | — | — | — | — | 100 | 100 |
| Magsalat 150ST | — | — | — | — | 34 | — |
| Methacrylic acid | — | — | — | — | 28 | — |
| Dicumyl peroxide | — | — | — | — | 0.75 | 0.90 |
| Zinc acrylate | — | — | — | — | — | 22 |
| Zinc oxide | — | — | — | — | — | 5 |
| Barium sulfate | — | — | — | — | — | *1) |
| 2-thionaphthol | — | — | — | — | — | 0.2 |
| Nocrac 200 | — | — | — | — | — | 0.2 |

Formulation: Parts by mass
*1) As to an amount of barium sulfate, adjustment was made such that the golf ball had a mass of 45.4 g.

Himilan AM7327: Zinc ion neutralized ethylene-methacrylic acid-butyl acrylate ternary copolymer ionomer resin available from Du Pont-Mitsui Polychemicals Co., Ltd.
Nucrel AN4319: Ethylene-methacrylic acid-butyl acrylate ternary copolymer available from Du Pont-Mitsui Polychemicals Co., Ltd.

Basic magnesium oleate: available from Nitto Kasei Kogyo K.K. (metal content: 1.7 mol %)
Basic magnesium oleate: available from Nitto Kasei Kogyo K.K. (metal content: 1.4 mol %)
Magnesium hydroxide: available from Wako Pure Chemical Industries Ltd.
Oleylbetaine (oleyldimethylaminoacetic acid betaine): a purified preparation of "Chembetaine OL" available from The Lubrizol Corporation (water and salt are removed)
Polybutadiene rubber: BR-730, high-cis polybutadiene (cis-1,4 bond=96 mass %, 1,2-vinyl bond content=1.3 mass %, Moony viscosity ($ML_{1+4}$ (100° C.)=55, molecular weight distribution (Mw/Mn)=3) available from JSR Corporation
Zinc acrylate: Sanceler SR (product of 10 mass % stearic acid coating) available from Sanshin Chemical Industry Co., Ltd.
Magsalat 150ST: Magnesium oxide available from Kyowa Chemical Industry Co., Ltd.
Methacrylic acid: available from Mitsubishi Rayon Co., Ltd.
Dicumyl peroxide: "Percumyl (Registered trade mark) D (dicumyl peroxide)" available from NFO Corporation
Zinc oxide: "Ginrei R" available from Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
2-thionaphthol: available from Tokyo Chemical Industry Co., Ltd.
Nocrac 200: 2,6-di-t-butyl-4-methylphenol available from Ouchi Shinko Chemical Industrial Co., Ltd.

(2) Production of Core

The envelope layer rubber compositions shown in Table 4 were kneaded. The half shells were molded from the envelope layer rubber composition. Molding of half shells was conducted by charging the envelope layer rubber compositions into each of the depressed part of the lower molds for molding half shells and applying a pressure to the molds. The compression molding was conducted under the conditions of molding temperature: 25° C., molding time: 3 minutes, molding pressure: 15 MPa. The spherical centers obtained above were covered with two half shells. The spherical centers together with half shells were placed in the molds composed of upper and lower molds each having a spherical cavity and heat pressed at the conditions of temperature: 150° C., pressure: 12 MPa, and time: 20 minutes. It is noted that a blending amount of barium sulfate was adjusted to make the resultant golf ball have a mass of 45.4 g.

TABLE 4

| | Envelope layer rubber composition No. | | | | | | | | | | |
|---|---|---|---|---|---|---|---|---|---|---|---|
| | 1 | 2 | 3 | 4 | 5 | 6 | 7 | 8 | 9 | 10 | 11 |
| Polybutadiene rubber | 100 | 100 | 100 | 100 | 100 | 100 | 100 | 100 | 100 | 100 | 100 |
| Zinc acrylate | 26 | 27.5 | 29.5 | 31.5 | 27 | 26.5 | 25.5 | 25 | 25.5 | 26 | 25.5 |
| Zinc oxide | 5 | 5 | 5 | 5 | 5 | 5 | 5 | 5 | 5 | 5 | 5 |
| Barium sulfate | *1) | *1) | *1) | *1) | *1) | *1) | *1) | *1) | *1) | *1) | *1) |
| 2-thionaphthol | 0.2 | 0.2 | 0.2 | 0.2 | 0.2 | 0.2 | 0.2 | 0.2 | 0.2 | 0.2 | 0.2 |
| Zinc octanoate | — | — | — | — | — | — | 2.5 | 5 | — | — | — |
| Zinc laurate | — | — | — | — | — | — | — | — | 10 | — | — |
| Zinc myristate | — | — | — | — | — | — | — | — | — | 5 | 10 |
| Zinc stearate | 10 | 20 | 30 | 40 | 0 | 0.5 | — | — | — | — | — |
| Dicumyl peroxide | 0.75 | 0.75 | 0.75 | 0.75 | 0.75 | 0.75 | 0.75 | 0.75 | 0.75 | 0.75 | 0.75 |

Formulation: Parts by mass
*1) As to an amount of barium sulfate, adjustment was made such that the golf ball had a mass of 45.4 g.

Polybutadiene rubber: BR730, a high-cis polybutadiene (cis-1,4 bond content=96 mass %, 1,2-vinyl bond content=1.3 mass %, Moony viscosity ($ML_{1+4}$ (100° C.)=55, molecular weight distribution (Mw/Mn)=3) available from JSR Corporation
Zinc acrylate: Sanceler SR (product of 10 mass % stearic acid coating) available from Sanshin Chemical Industry Co., Ltd.
Zinc oxide: "Ginrei R" manufactured by Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
2-thionaphthol: manufactured by Tokyo Chemical Industry Co., Ltd.
Dicumyl peroxide: "Percumyl (registered trademark) D" manufactured by NOF Corporation.
Zinc octanoate: available from Mitsuwa Chemicals Co., Ltd. (Purity: 99% or more)
Zinc laurate: available from Mitsuwa Chemicals Co., Ltd. (Purity: 99% or more)

Zinc myristate: manufactured by NOF Corporation (Purity: 90% or more)

Zinc stearate: manufactured by Wako Pure Chemical Industries, Ltd. (Purity: 99% or more)

TABLE 5

| | | Golf ball No. | | | | | |
|---|---|---|---|---|---|---|---|
| | | 1 | 2 | 3 | 4 | 5 | 6 |
| Center, envelope layer, core | Center composition No. | J1 | J2 | J3 | J4 | J6 | J4 |
| | Spherical center diameter (mm) | 15.0 | 15.0 | 15.0 | 15.0 | 15.0 | 20.0 |
| | Envelope layer composition No. | 1 | 1 | 1 | 1 | 1 | 1 |
| | Core diameter (mm) | 39.1 | 39.1 | 39.1 | 39.1 | 39.1 | 39.1 |
| | Core compression deformation amount (mm) | 3.9 | 3.9 | 4.0 | 3.9 | 3.9 | 3.9 |
| Core hardness distribution (JIS-C) | Core center hardness | 60.0 | 50.0 | 44.0 | 60.0 | 60.0 | 60.0 |
| | 2.5 mm | 60.0 | 50.0 | 44.0 | 60.0 | 61.0 | 60.0 |
| | 5.0 mm | 60.0 | 50.0 | 44.0 | 60.0 | 62.0 | 60.0 |
| | 7.0 mm | 60.0 | 50.0 | 44.0 | 60.0 | 63.0 | — |
| | 7.5 mm | — | — | — | — | — | 60.0 |
| | 8.0 mm | 64.6 | 64.6 | 64.6 | 64.6 | 64.6 | — |
| | 9.5 mm | — | — | — | — | — | 60.0 |
| | 10.0 mm | 67.0 | 67.0 | 67.0 | 67.0 | 67.0 | — |
| | 10.5 mm | — | — | — | — | — | 67.5 |
| | 12.0 mm | — | — | — | — | — | — |
| | 12.5 mm | 71.8 | 71.8 | 71.8 | 71.8 | 71.8 | 71.8 |
| | 13.0 mm | — | — | — | — | — | — |
| | 15.0 mm | 76.0 | 76.0 | 76.0 | 76.0 | 76.0 | 76.0 |
| | 17.5 mm | 79.5 | 79.5 | 79.5 | 79.5 | 79.5 | 79.5 |
| | Surface hardness | 83.0 | 83.0 | 83.0 | 83.0 | 83.0 | 83.0 |
| | Surface hardness − center hardness | 23.0 | 33.0 | 39.0 | 23.0 | 23.0 | 23.0 |
| Surface of envelope layer - border | | 18.4 | 18.4 | 18.4 | 18.4 | 18.4 | 15.5 |
| Inner cover composition | | C6 | C6 | C6 | C6 | C6 | C6 |
| Outermost cover layer composition | | C1 | C1 | C1 | C1 | C1 | C1 |
| Inner cover thickness (mm) | | 1.0 | 1.0 | 1.0 | 1.0 | 1.0 | 1.0 |
| Outermost cover layer thickness (mm) | | 0.8 | 0.8 | 0.8 | 0.8 | 0.8 | 0.8 |
| Total cover thickness (mm) | | 1.8 | 1.8 | 1.8 | 1.8 | 1.8 | 1.8 |
| Inner cover hardness (JIS-C) | | 85 | 85 | 85 | 85 | 85 | 85 |
| Outermost cover layer hardness (JIS-C) | | 92 | 92 | 92 | 92 | 92 | 92 |
| Ball | Ball speed (m/s) | 57.97 | 57.96 | 57.96 | 57.99 | 57.97 | 57.98 |
| | Compression deformation amount (mm) | 3.24 | 3.26 | 3.29 | 3.24 | 3.19 | 3.21 |
| | Driver spin rate (rpm) | 2330 | 2340 | 2305 | 2295 | 2290 | 2305 |
| | Driver flying distance (m) | 202.8 | 202.6 | 203.1 | 203.4 | 203.4 | 203.2 |

TABLE 6

| | | Golf ball No. | | | | | |
|---|---|---|---|---|---|---|---|
| | | 7 | 8 | 9 | 10 | 11 | 12 |
| Center, envelope layer, core | Center composition No. | J4 | J4 | J4 | J4 | J4 | J4 |
| | Spherical center diameter (mm) | 25.0 | 15.0 | 15.0 | 15.0 | 15.0 | 15.0 |
| | Envelope layer composition No. | 1 | 1 | 1 | 1 | 1 | 1 |
| | Core diameter (mm) | 39.1 | 38.5 | 37.9 | 39.1 | 39.1 | 39.1 |
| | Core compression deformation amount (mm) | 3.9 | 3.9 | 3.9 | 3.9 | 3.9 | 3.9 |
| Core hardness distribution (JIS-C) | Core center hardness | 60.0 | 60.0 | 60.0 | 60.0 | 60.0 | 60.0 |
| | 2.5 mm | 60.0 | 60.0 | 60.0 | 60.0 | 60.0 | 60.0 |
| | 5.0 mm | 60.0 | 60.0 | 60.0 | 60.0 | 60.0 | 60.0 |
| | 7.0 mm | — | 60.0 | 60.0 | 60.0 | 60.0 | 60.0 |
| | 7.5 mm | 60.0 | — | — | — | — | — |
| | 8.0 mm | — | 64.6 | 64.6 | 64.6 | 64.6 | 64.6 |
| | 9.5 mm | — | — | — | — | — | — |
| | 10.0 mm | 60.0 | 67.0 | 67.0 | 67.0 | 67.0 | 67.0 |
| | 10.5 mm | — | — | — | — | — | — |
| | 12.0 mm | 60.0 | — | — | — | — | — |
| | 12.5 mm | — | 71.8 | 71.8 | 71.8 | 71.8 | 71.8 |
| | 13.0 mm | 72.5 | — | — | — | — | — |
| | 15.0 mm | 76.0 | 76.0 | 76.0 | 76.0 | 76.0 | 76.0 |
| | 17.5 mm | 79.5 | 79.5 | 79.5 | 79.5 | 79.5 | 79.5 |
| | Surface hardness | 83.0 | 82.5 | 82.1 | 82.1 | 83.0 | 83.0 |

TABLE 6-continued

| | | Golf ball No. | | | | | |
|---|---|---|---|---|---|---|---|
| | | 7 | 8 | 9 | 10 | 11 | 12 |
| | Surface hardness − center hardness | 23.0 | 22.5 | 22.1 | 22.1 | 23.0 | 23.0 |
| Surface of envelope layer - border | | 10.5 | 17.9 | 17.5 | 17.5 | 18.4 | 18.4 |
| Inner cover composition | | C6 | C6 | C6 | — | C9 | C8 |
| Outermost cover layer composition | | C1 | C1 | C1 | C1 | C1 | C1 |
| Inner cover thickness (mm) | | 1.0 | 1.0 | 1.0 | — | 1.0 | 1.0 |
| Outermost cover layer thickness (mm) | | 0.8 | 1.1 | 1.4 | 1.8 | 0.8 | 0.8 |
| Total cover thickness (mm) | | 1.8 | 2.1 | 2.4 | 1.8 | 1.8 | 1.8 |
| Inner cover hardness (JIS-C) | | 85 | 85 | 85 | — | 65 | 76 |
| Outermost cover layer hardness (JIS-C) | | 92 | 92 | 92 | 92 | 92 | 92 |
| Ball | Ball speed (m/s) | 57.97 | 58.00 | 58.02 | 57.99 | 57.96 | 57.98 |
| | Compression deformation amount (mm) | 3.19 | 3.22 | 3.2 | 3.28 | 3.32 | 3.29 |
| | Driver spin rate (rpm) | 2315 | 2345 | 2340 | 2395 | 2400 | 2380 |
| | Driver flying distance (m) | 203.0 | 202.7 | 202.9 | 201.9 | 201.7 | 202.1 |

TABLE 7

| | | Golf ball No. | | | | | |
|---|---|---|---|---|---|---|---|
| | | 13 | 14 | 15 | 16 | 17 | 18 |
| Center envelope layer core | Center composition No. | J4 | J6 | J6 | J6 | J6 | J6 |
| | Spherical center diameter (mm) | 15.0 | 15.0 | 15.0 | 15.0 | 15.0 | 15.0 |
| | Envelope layer composition No. | 1 | 7 | 8 | 9 | 10 | 11 |
| | Core diameter (mm) | 39.1 | 39.1 | 39.1 | 39.1 | 39.1 | 39.1 |
| | Core compression deformation amount (mm) | 3.9 | 3.9 | 3.8 | 3.9 | 3.9 | 3.8 |
| Core hardness distribution (JIS-C) | Core center hardness | 60.0 | 60.0 | 60.0 | 60.0 | 60.0 | 60.0 |
| | 2.5 mm | 60.0 | 61.0 | 61.0 | 61.0 | 61.0 | 61.0 |
| | 5.0 mm | 60.0 | 62.0 | 62.0 | 62.0 | 62.0 | 62.0 |
| | 7.0 mm | 60.0 | 63.0 | 63.0 | 63.0 | 63.0 | 63.0 |
| | 7.5 mm | — | — | — | — | — | — |
| | 8.0 mm | 64.6 | 65.2 | 63.8 | 64.4 | 67.0 | 65.5 |
| | 9.5 mm | — | — | — | — | — | — |
| | 10.0 mm | 67.0 | 67.4 | 67.9 | 66.4 | 68.5 | 67.4 |
| | 10.5 mm | — | — | — | — | — | — |
| | 12.0 mm | — | — | — | — | — | — |
| | 12.5 mm | 71.8 | 71.0 | 73.8 | 71.0 | 70.1 | 71.8 |
| | 13.0 mm | — | — | — | — | — | — |
| | 15.0 mm | 76.0 | 75.3 | 77.8 | 77.0 | 76.7 | 77.5 |
| | 17.5 mm | 79.5 | 80.6 | 82.0 | 80.7 | 80.5 | 81.3 |
| | Surface hardness | 83.0 | 84.1 | 84.9 | 83.3 | 83.4 | 84.5 |
| | Surface hardness − center hardness | 23.0 | 24.1 | 24.9 | 23.3 | 23.4 | 24.5 |
| Surface of envelope layer - border | | 18.4 | 18.9 | 21.1 | 18.9 | 16.4 | 19.0 |
| Inner cover composition | | C5 | C7 | C7 | C7 | C7 | C7 |
| Outermost cover layer composition | | C1 | C1 | C1 | C1 | C1 | C1 |
| Inner cover thickness (mm) | | 1.0 | 1.0 | 1.0 | 1.0 | 1.0 | 1.0 |
| Outermost cover layer thickness (mm) | | 0.8 | 0.8 | 0.8 | 0.8 | 0.8 | 0.8 |
| Total cover thickness (mm) | | 1.8 | 1.8 | 1.8 | 1.8 | 1.8 | 1.8 |
| Inner cover hardness (JIS-C) | | 89 | 83 | 83 | 83 | 83 | 83 |
| Outermost cover layer hardness (JIS-C) | | 92 | 92 | 92 | 92 | 92 | 92 |
| Ball | Ball speed (m/s) | 58.05 | 58.00 | 57.99 | 57.98 | 57.98 | 57.97 |
| | Compression deformation amount (mm) | 3.21 | 3.24 | 3.2 | 3.22 | 3.23 | 3.21 |
| | Driver spin rate (rpm) | 2310 | 2380 | 2305 | 2365 | 2400 | 2380 |
| | Driver flying distance (m) | 203.5 | 202.2 | 203.3 | 202.3 | 201.8 | 202.0 |

TABLE 8

| | | Golf ball No. | | | |
|---|---|---|---|---|---|
| | | 19 | 20 | 21 | 22 |
| Center, envelope layer, core | Center composition No. | J6 | J6 | J6 | J6 |
| | Spherical center diameter (mm) | 15.0 | 15.0 | 15.0 | 15.0 |
| | Envelope layer composition No. | 6 | 2 | 3 | 4 |
| | Core diameter (mm) | 39.1 | 39.1 | 39.1 | 39.1 |
| | Core compression deformation amount (mm) | 3.9 | 3.9 | 3.9 | 3.9 |
| Core hardness distribution (JIS-C) | Core center hardness | 60.0 | 60.0 | 60.0 | 60.0 |
| | 2.5 mm | 61.0 | 61.0 | 61.0 | 61.0 |
| | 5.0 mm | 62.0 | 62.0 | 62.0 | 62.0 |
| | 7.0 mm | 63.0 | 63.0 | 63.0 | 63.0 |
| | 7.5 mm | — | — | — | — |
| | 8.0 mm | 68.8 | 62.8 | 64.0 | 64.3 |
| | 9.5 mm | — | — | — | — |
| | 10.0 mm | 70.0 | 66.6 | 66.8 | 67.0 |
| | 10.5 mm | — | — | — | — |
| | 12.0 mm | — | — | — | — |
| | 12.5 mm | 71.2 | 73.7 | 71.0 | 70.4 |
| | 13.0 mm | — | — | — | — |
| | 15.0 mm | 74.8 | 75.4 | 72.1 | 70.5 |
| | 17.5 mm | 78.8 | 78.2 | 73.0 | 68.5 |
| | Surface hardness | 82.9 | 81.6 | 79.1 | 70.7 |
| | Surface hardness – center hardness | 22.9 | 21.6 | 19.1 | 10.7 |
| Surface of envelope layer-border | | 14.1 | 18.8 | 15.1 | 6.4 |
| Inner cover composition | | C6 | C6 | C6 | C5 |
| Outermost cover layer composition | | C1 | C1 | C1 | C1 |
| Inner cover thickness (mm) | | 1.0 | 1.0 | 1.0 | 1.0 |
| Outermost cover layer thickness (mm) | | 0.8 | 0.8 | 0.8 | 0.8 |
| Total cover thickness (mm) | | 1.8 | 1.8 | 1.8 | 1.8 |
| Inner cover hardness (JIS-C) | | 85 | 85 | 85 | 89 |
| Outermost cover layer hardness (JIS-C) | | 92 | 92 | 92 | 92 |
| Ball | Ball speed (m/s) | 58.01 | 57.98 | 57.97 | 58.03 |
| | Compression deformation amount (mm) | 3.2 | 3.2 | 3.19 | 3.22 |
| | Driver spin rate (rpm) | 2420 | 2350 | 2355 | 2435 |
| | Driver flying distance (m) | 201.6 | 202.5 | 202.4 | 201.5 |

TABLE 9

| | | Golf ball No. | | | | | |
|---|---|---|---|---|---|---|---|
| | | 23 | 24 | 25 | 26 | 27 | 28 |
| Center, envelope layer, core | Center composition No. | J6 | J4 | J4 | J5 | — | — |
| | Spherical center diameter (mm) | 15.0 | 15.0 | 15.0 | 15.0 | — | — |
| | Envelope layer composition No. | 5 | 1 | 1 | 1 | 1 | 1 |
| | Core diameter (mm) | 39.1 | 39.1 | 39.1 | 39.1 | 39.1 | 39.1 |
| | Core compression deformation amount (mm) | 3.9 | 3.9 | 3.9 | 3.9 | 3.9 | 3.9 |
| Core hardness distribution (JIS-C) | Core center hardness | 60.0 | 60.0 | 60.0 | 55.0 | 54.0 | 54.0 |
| | 2.5 mm | 61.0 | 60.0 | 60.0 | 56.0 | 59.8 | 59.8 |
| | 5.0 mm | 62.0 | 60.0 | 60.0 | 58.0 | 63.0 | 63.0 |
| | 7.0 mm | 63.0 | 60.0 | 60.0 | 60.0 | 64.6 | 64.6 |
| | 7.5 mm | — | — | — | — | — | — |
| | 8.0 mm | 67.7 | 64.6 | 64.6 | 64.6 | 64.6 | 64.6 |
| | 9.5 mm | — | — | — | — | — | — |
| | 10.0 mm | 68.6 | 67.0 | 67.0 | 67.0 | 67.0 | 67.0 |
| | 10.5 mm | — | — | — | — | — | — |
| | 12.0 mm | — | — | — | — | — | — |
| | 12.5 mm | 70.6 | 71.8 | 71.8 | 71.8 | 71.8 | 71.8 |
| | 13.0 mm | — | — | — | — | — | — |
| | 15.0 mm | 74.1 | 76.0 | 76.0 | 76.0 | 76.0 | 76.0 |
| | 17.5 mm | 79.0 | 79.5 | 79.5 | 79.5 | 79.5 | 79.5 |
| | Surface hardness | 83.0 | 83.0 | 83.0 | 83.0 | 83.0 | 83.0 |
| | Surface hardness – center hardness | 23.0 | 23.0 | 23.0 | 28.0 | 29.0 | 29.0 |
| Surface of envelope layer - border | | 15.3 | 18.4 | 18.4 | 18.4 | 18.4 | 18.4 |
| Inner cover composition | | C6 | C8 | C5 | C6 | — | C7 |
| Outermost cover layer composition | | C1 | C3 | C3 | C1 | C1 | C1 |
| Inner cover thickness (mm) | | 1.0 | 1.0 | 1.0 | 1.0 | — | 1.0 |
| Outermost cover layer thickness (mm) | | 0.8 | 0.8 | 0.8 | 0.8 | 1.8 | 0.8 |
| Total cover thickness (mm) | | 1.8 | 1.8 | 1.8 | 1.8 | 1.8 | 1.8 |
| Inner cover hardness (JIS-C) | | 85 | 76 | 89 | 85 | — | 83 |

TABLE 9-continued

| | | Golf ball No. | | | | | |
|---|---|---|---|---|---|---|---|
| | | 23 | 24 | 25 | 26 | 27 | 28 |
| Outermost cover layer hardness (JIS-C) | | 92 | 71 | 71 | 92 | 92 | 92 |
| Ball | Ball speed (m/s) | 58.00 | 57.92 | 57.98 | 57.91 | 57.92 | 57.94 |
| | Compression deformation amount (mm) | 3.2 | 3.35 | 3.27 | 3.24 | 3.23 | 3.22 |
| | Driver spin rate (rpm) | 2465 | 2565 | 2505 | 2415 | 2425 | 2485 |
| | Driver flying distance (m) | 200.9 | 199.0 | 200.2 | 201.2 | 201.1 | 200.3 |

(2) Preparation of Cover Composition

Blending materials shown in Table 10 were mixed with a twin-screw kneading extruder to prepare cover compositions in the pellet form. The extruding conditions were a screw diameter of 45 mm, a screw rotational speed of 200 rpm, and screw L/D=35, and the mixtures were heated to 160° C. to 230° C. at the die position of the extruder.

TABLE 10

| Cover composition No. | C1 | C3 | C5 | C6 | C7 | C8 | C9 |
|---|---|---|---|---|---|---|---|
| Himilan AM 7337 | 5 | 30 | 51 | 40 | 24 | 26 | 26 |
| Himilan #1555 | 10 | — | — | — | — | — | — |
| Himilan #1605 | — | — | — | — | — | — | — |
| Himilan AM7329 | 55 | 30 | 40 | 40 | 50 | 40 | 26 |
| Nucrel 1050H | 30 | — | — | — | — | — | — |
| Rabalon T3221C | — | 40 | 9 | 20 | 26 | 34 | 48 |
| Titanium dioxide | 3 | 6 | 6 | 6 | 6 | 6 | 6 |
| Tinuvin 770 | 0.2 | 0.2 | — | — | — | — | — |
| Slab hardness (JIS-C) | 92 | 71 | 89 | 85 | 83 | 76 | 65 |

Formulation: Parts by mass

Himilan AM7337: Sodium ion-neutralized ethylene-methacrylic acid copolymer ionomer resin, available from Du Pont-Mitsui Polychemicals Co., Ltd.
Himilan 1555: Sodium ion-neutralized ethylene-methacrylic acid copolymer ionomer resin, available from Du Pont-Mitsui Polychemicals Co., Ltd.
Himilan 1605: Sodium ion-neutralized ethylene-methacrylic acid copolymer ionomer resin, available from Du Pont-Mitsui Polychemicals Co., Ltd.
Himilan AM7329: Zinc ion-neutralized ethylene-methacrylic acid copolymer ionomer resin, available from Du Pont-Mitsui Polychemicals Co., Ltd.
Nucrel 1050H: Ethylene-methacrylic acid copolymer available from Du Pont-Mitsui Polychemicals Co., Ltd.
Rabalon T3221C: Thermoplastic styrene elastomer available from Mitsubishi Chemical Corporation.
Titanium dioxide: A220, available from Ishihara Sangyo Kaisha, Ltd.
Tinuvin770: Hindered amine type stabilizer available from BSFA Japan Ltd.

(3) Production of Golf Ball Body

The cover compositions obtained above were injection-molded onto the spherical cores to form the inner covers and outermost cover layers covering the spherical cores. When molding the cover, the hold pins were protruded to hold the cores which were placed in the molds, the resin heated at 210° C. to 260° C. was charged into the molds clamped under a pressure of 80 tons within 0.3 seconds, and cooled for 30 seconds. Then, the mold was opened, and the golf ball bodies were ejected from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The evaluations of the obtained golf balls were shown in Tables 5 to 9.

As shown in Tables 5 to 9, the golf balls comprising a core composed of a spherical center and an envelope layer and at least one cover layer disposed outside the core, wherein the spherical center has a hardness difference between any two points within the spherical center of less than 5 in JIS-C hardness, the envelope layer is formed from an envelope layer rubber composition containing (a) a base rubber, (b) an α,β-unsaturated carboxylic acid having 3 to 8 carbon atoms and/or a metal salt thereof as a co-crosslinking agent, (c) an crosslinking initiator and (d) an acid and/or a salt thereof, and an outermost cover layer has a highest hardness among constituent members of the golf ball, traveled a great flight distance on driver shots.

The golf ball of the present invention travels a great flight distance. This application is based on Japanese Patent application No. 2012-126601 filed on Jun. 1, 2012, the contents of which are hereby incorporated by reference.

The invention claimed is:

1. A golf ball comprising a core composed of a spherical center and an envelope layer and at least one cover layer disposed outside the core,
    wherein
    the spherical center has a hardness difference between a maximum hardness and a minimum hardness within the spherical center of less than 5 in JIS-C hardness,
    the envelope layer is formed from an envelope layer rubber composition containing
        (a) a base rubber,
        (b) an α,β-unsaturated carboxylic acid having 3 to 8 carbon atoms and/or a metal salt thereof as a co-crosslinking agent,
        (c) a crosslinking initiator and
        (d) a carboxylic acid and/or a salt thereof excluding the (b) α,β-unsaturated carboxylic acid having 3 to 8 carbon atoms and/or a metal salt thereof,
    the outermost cover layer has a hardness that is highest from among the spherical center, envelope layer and any other cover layer of the golf ball, and
    the envelope layer rubber composition contains (d) the carboxylic acid and/or the salt thereof in an amount of 1 part by mass or more and less than 40 parts by mass with respect to 100 parts by mass of (a) the base rubber, and
    the spherical center is formed from a center resin composition comprising
    at least one selected from the group consisting of an ionomer resin, a thermoplastic polyamide elastomer, a thermoplastic polyester elastomer, a thermoplastic polyurethane elastomer, and a thermoplastic styrene elastomer as a resin component.

2. The golf ball according to claim 1, wherein the envelope layer rubber composition further contains (e) an organic sulfur compound.

3. The golf ball according to claim 2, wherein (e) the organic sulfur compound includes at least one compound selected from the group consisting of thiophenols, polysulfides having 2 to 4 sulfur atoms, thionaphthols, thiurams, or metal salts thereof.

4. The golf ball according to claim 2, wherein the envelope layer rubber composition contains (e) the organic sulfur compound in an amount ranging from 0.05 part by mass to 5 parts by mass with respect to 100 parts by mass of (a) the base rubber.

5. The golf ball according to claim 1, wherein the envelope layer rubber composition contains (b) the α,β-unsaturated carboxylic acid having 3 to 8 carbon atoms and/or the metal salt thereof in an amount ranging from 15 parts by mass to 50 parts by mass with respect to 100 parts by mass of (a) the base rubber.

6. The golf ball according to claim 1, wherein the envelope layer rubber composition further contains (f) a metal compound in case of containing only (b) the α,β-unsaturated carboxylic acid having 3 to 8 carbon atoms as the co-crosslinking agent.

7. The golf ball according to claim 1, wherein the envelope layer rubber composition contains (c) the crosslinking initiator in an amount of 0.2 part by mass to 5 parts by mass with respect 100 parts by mass of (a) the base rubber.

8. The golf ball according to claim 1, wherein a total thickness of at least one cover layer is 2.5 mm or less.

9. The golf ball according to claim 1, wherein the center resin composition further includes at least one selected from the group consisting of an anionic surfactant having an anionic portion and containing sulfur, an amphoteric surfactant having a cationic and anionic portions, and a basic metal salt of a fatty acid.

10. The golf ball according to claim 1, wherein the center resin composition further includes at least one selected from the group consisting of an anionic surfactant having an anionic portion and containing sulfur, an amphoteric surfactant having a cationic and anionic portions.

* * * * *